United States Patent [19]

Fujiwara et al.

[11] Patent Number: 4,887,573
[45] Date of Patent: Dec. 19, 1989

[54] IGNITION TIMING ADJUSTING APPARATUS FOR INTERNAL COMBUSTION ENGINE

[75] Inventors: Yasuhiko Fujiwara, Kanagawa; Toshiro Abe, Mitaka; Atsunori Hashimoto, Fujisawa; Shinsuke Nakazawa, Yokohama; Masami Nagano; Takeshi Atago, both of Katsuta, all of Japan

[73] Assignees: Hitachi, Ltd, Tokyo; Nissan Motor Co., Ltd., Yokohama, both of Japan

[21] Appl. No.: 268,198

[22] Filed: Nov. 7, 1988

[30] Foreign Application Priority Data

Nov. 9, 1987 [JP] Japan .................. 62-280922

[51] Int. Cl.$^4$ ............. F02P 5/15; F02P 5/14; F02P 5/04
[52] U.S. Cl. ........................ 123/422; 123/425
[58] Field of Search ............. 123/422, 339, 425, 436, 123/418, 416, 423, 407, 492; 364/431.05

[56] References Cited

U.S. PATENT DOCUMENTS

| | | | |
|---|---|---|---|
| 4,423,714 | 1/1984 | Hagashi | 123/407 |
| 4,508,079 | 4/1985 | Konurasak et al. | 123/425 |
| 4,520,783 | 6/1985 | Matsushita et al. | 123/492 |
| 4,601,272 | 7/1986 | Nagai | 123/425 |
| 4,626,997 | 12/1986 | Takada et al. | 364/431.05 |
| 4,640,249 | 2/1987 | Kawamura et al. | 123/422 |
| 4,640,251 | 2/1987 | Harada et al. | 123/422 |
| 4,658,787 | 4/1987 | Takizawa | 123/422 |
| 4,732,125 | 3/1988 | Takizawa | 123/422 |

Primary Examiner—Raymond A. Nelli
Attorney, Agent, or Firm—Antonelli, Terry & Wands

[57] ABSTRACT

An ignition timing adjusting apparatus of an internal combustion engine is provided so as to suppress the vibration of the body of a vehicle when it is accelerated. This is achieved by obtaining a first ignition timing compensation magnitude determined on the basis of the revolution speed fluctuation of the internal combustion engine and a second ignition timing compensation magnitude determined on the basis of the engine load condition, and by compensating a basic ignition timing in accordance with the first and second ignition timing compensation magnitude when the vehicle is accelerated.

4 Claims, 13 Drawing Sheets

BASIC IGNITION TIMING

FIG. 16

PULSE WIDTH (ms)

IGNITION TIMING ADJUSTING APPARATUS FOR INTERNAL COMBUSTION ENGINE

FIELD OF THE INVENTION

The present invention relates to an ignition timing adjusting apparatus for internal combustion engine (hereinafter referred to simply as engine), especially to the one which is suitable for assuring a smooth rise of an engine speed in acceleration mode.

BACKGROUND OF THE INVENTION

Various control systems have been developed up to this time in order to obtain best revolution speeds of an engine in various operation modes thereof. To adjust ignition timing of an engine is applied as one of these control systems.

In an ignition timing adjusting apparatus of an electric control type, the adjustment is achieved by previously obtaining the most suitable ignition timing corresponding to various conditions of an engine, for example, fuel injection pulse width and engine revolution speed according to an experience etc. thereof, and by storing data corresponding to the detected results in a memory element such as ROM (read-only memory). And, in an actual operation of an engine, the adjustment of ignition timing is effected by reading out the ignition timing data according to fuel injection pulse width and engine revolution speed in the actual conditions of an engine.

When an accelerator pedal is pushed, a large amount of combustion air is supplied to the engine, and then the combustion fuel is increased to accelerate engine speed. It has been known that, in an acceleration phase, the fluctuation in the engine speed is involved in order that the engine revolution is not rised smoothly. There has been a problem of an uncomfatable riding feeling that the fluctuation in the engine speed is uncomfatable as a bodily sensation so that it is wobbly felt in operation of engine (hereinafter referred to a wobbly vibration).

The wobbly vibration is caused as the fluctuation of an engine revolution speed by unstable one. The prevention of the wobbly vibration can be effected by controlling the engine speed so as to suppress the engine speed when it is increased and increase the engine speed when it begins to be decreased.

Japanese Patent Laid-Open No. 61-157767 discloses a method for preventing such a wobbly vibration, which method is based on that an engine torque can be controlled by advancing or delaying the ignition timing of engine. Accordingly, when engine speed become low in causing the wobbly vibration, engine torque is increased by advancing ignition timing, while, when high in causing the wobbly vibration, engine torque is decreased by delaying ignition timing.

Further, Japanese Patent Application No. 61-117312 filed by the present applicant discloses a method where a basic ignition timing is compensated by ignition timing compensation magnitude determined on the basis of an engine speed fluctuation during a predetermined period of engine operation. Since this method compensates the ignition timing in consideration of the engine speed fluctuation, it has been possible to effectively prevent the wobbly vibration.

At that time, engine torque is considerably fluctuated when the ignition timing is compensated in such case that a throttle valve is unnecessarily opened, while engine torque is not fluctuated considerably by compensating the ignition timing in case of a partial engine load. Thus, it is seen that the torque value determined by the engine load is different from that determined by the compensation magnitude of ignition timing. Therefore, the wobbly vibration could not be effectively prevented by compensating the basic ignition timing only on the basis of a revolution speed fluctuation of the engine during a predetermined period of the engine operation, because its compensation is not fully considered as to the engine load.

SUMMARY OF THE INVENTION

It is an object of the present invention to provide an ignition timing adjusting apparatus for internal combustion engine which solves the abovementioned problems. For achieving this object, the ignition timing adjusting apparatus for an internal combustion engine according to the present invention comprises means for determining a basic ignition timing on the basis of a state magnitude representing an operational state of the engine, means for detecting an acceleration of the engine, means for detecting a revolution speed change of the engine, first compensating means for determining a compensation magnitude of first ignition timing needed due to compensating the basic ignition timing on the basis of an output of the revolution speed change detecting means, second compensating means for determining a compensation magnitude of second ignition timing needed due to compensating the basic ignition timing on the basis of an load condition of the engine, and ignition timing determining means for determining an ignition timing on the basis of the basic ignition timing, the first compensation magnitude of the ignition timing and the second compensation magnitude of the ignition timing when the acceleration of the engine is detected by the acceleration detecting means.

In the above-outlined apparatus of the present invention, when the engine is accelerated, the first compensation magnitude of the ignition timing for compensating the basic ignition timing is determined on the basis of a signal of the revolution speed change detecting means and thereby suppress the revolution speed change caused by increasing or decreasing the engine revolution speed. Further, the apparatus operates in such manner that the suppression rate of the revolution speed change is adjusted by determining the second compensation magnitude of the ignition timing for compensating the basic ignition timing on the basis of a load state of the engine. Accordingly, the wobbly vibration caused in an acceleration of the engine is effectively prevented in the wide range of the engine operation as above-mentioned.

DETAILED DESCRIPTION OF THE INVENTION

One embodiment of the present invention will be described hereafter by referring to the drawings.

Figure 1:
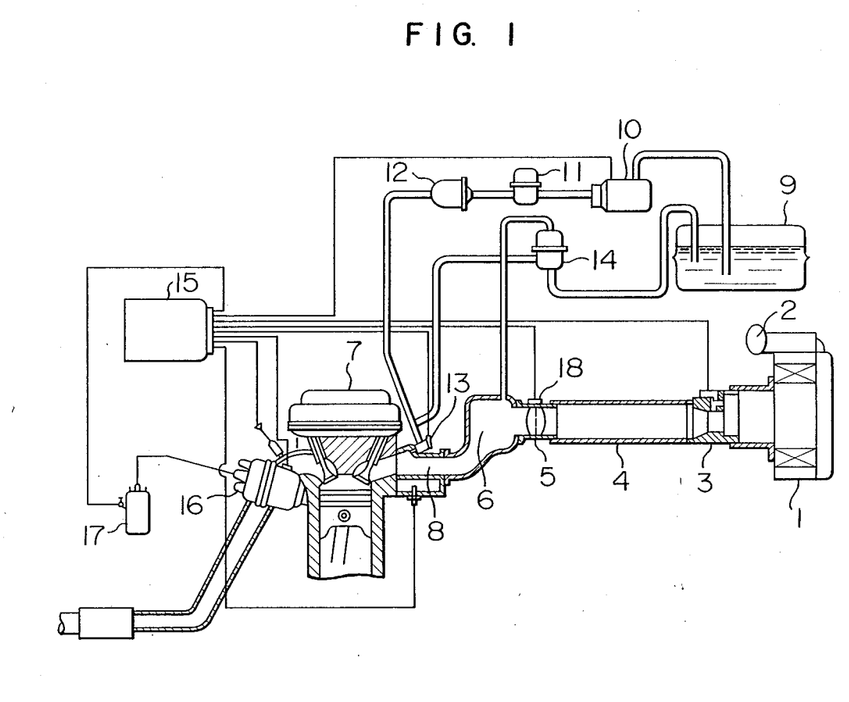
FIG. 1 is a schematic view of a fuel injection system.

FIG. 1 shows a control system for an engine system as a whole. A sunctioned combustion air is introduced from an inlet port 2 of an air cleaner 1 and supplied to a cylinder 7 through an air duct 4, a throttle body 5, a collector 6 and suction tube 8. A fuel injection valve 13 is mounted on the suction tube 8. The fuel injected from the fuel injection valve 13 is mixed with the suctioned combustion air, forming air-fuel mixture, and supplied to a combustion chamber in the cylinder 7 through the suction tube 8.

A fuel is supplied from a fuel tank 9 through a fuel pump 10, a fuel damper 11 and a fuel filter 12 to an injection valve 13. A pressure of the supplied fuel is regulated by a fuel pressure regulator 14 so as to maintain constant the pressure difference between at the suction tube 8 and at the injection valve 13. The air-fuel mixture introduced into combustion chamber in the cylinder 7 is compressed by the piston disposed in the cylinder, and ignited and burned by a spark generated by an ignition plug to which an electric current is supplied by distributing it from an distributor through an ignition coil 17. An air flow sensor 3 is arranged inside of the air duct 4, while a throttle sensor 18 inside of the throttle body 5. Electric signals generated by these sensors are input into a control unit 15, and computed therein. The outputs of the control unit control the injection valve 13 and the electric current of the ignition coil 17.

Figure 2:
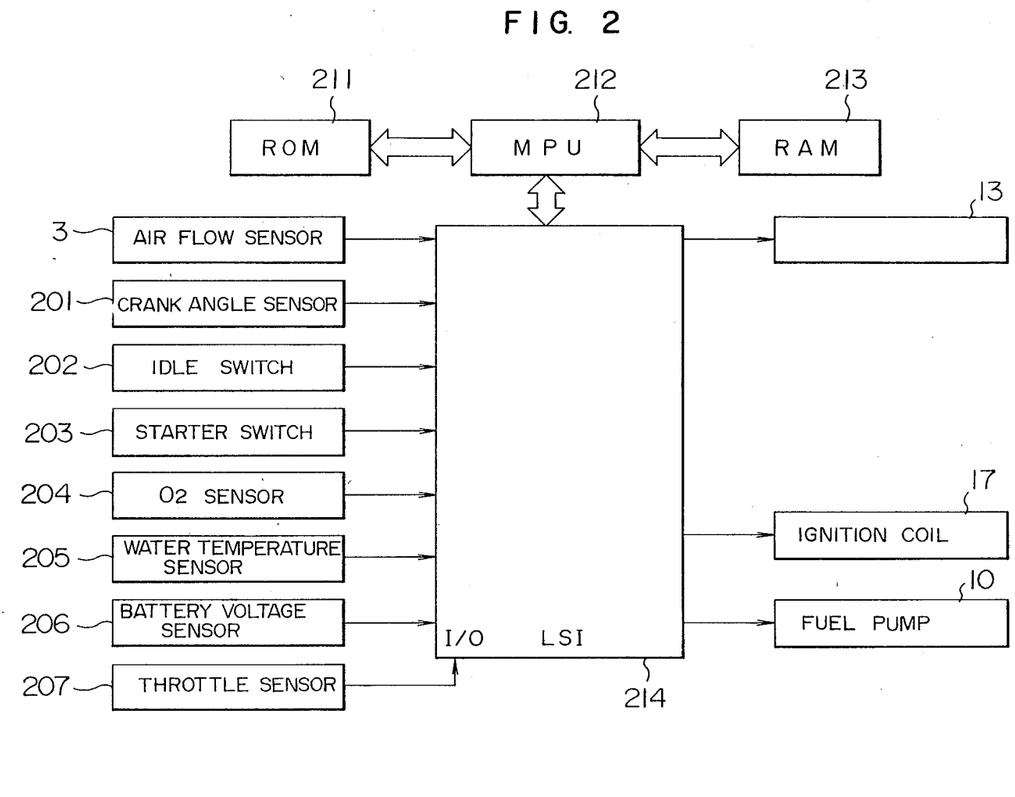
FIG. 2 is a block diagram of the fuel injection control system.

FIG. 2 shows detail of the control unit 15 in a form of block diagram, which is composed of a micro processor unit (hereinafter referred to as MPU) 212, a read only memory (ROM) 211, a random access memory (RAM) 213 and an input-output circuit (I/O) 214.

I/O receives outputs of air flow sensor 3, crank angle sensor 201, idle switch 202, starter switch 203, $O_2$ sensor 204, water temperature sensor 205, battery voltage sensor 206, and throttle sensor 18.

MPU 212 processes the information from I/0 214 in accordance with a program stored in ROM 211, and sends to I/O 214 the data as a control magnitude for controlling injection valve 13, the ignition coil 17 and the fuel pump 10. RAM 213 is used for temporarily storing data to be processed in MPU 212.

In I/O 214, pulses are generated in response to the data sent from MPU 212. The injection valve 13, the ignition coil 17 and the fuel pump 10 are controlled on the basis of these pulses.

Figure 3:
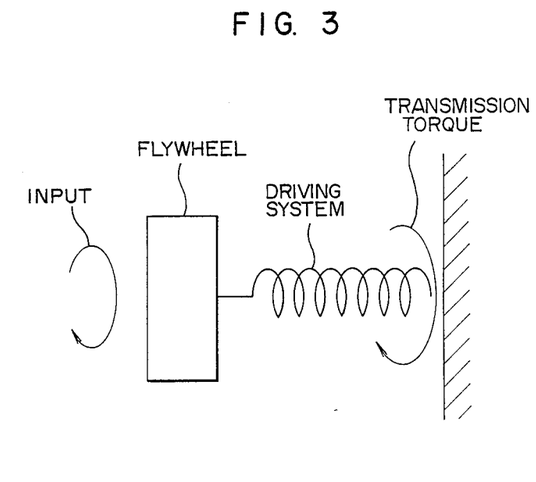
FIG. 3 shows a vibration system of one degree of freedom.

FIG. 3 shows a vibration system having one degree of freedom for explaining a wobbly vibration phenomenon. When an accelerator pedal is pushed stepwise, an engine torque is generated and drives the vibration system which is constituted by a mass element such as a flywheel and a spring elements such as a clutch, a drive shaft and tires, thereby producing a resonance in a torsional vibration of the vibration system, and causing the wobbly vibration according to the fore-and-aft vibration of vehicle.

Figure 4A:
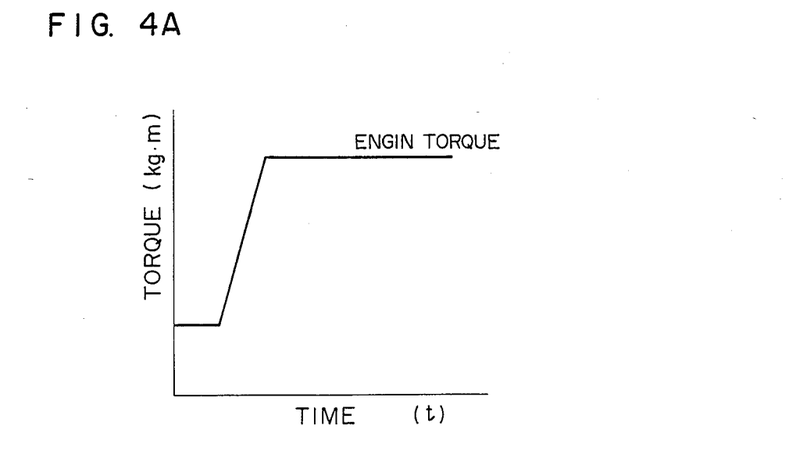
FIGS. 4A and 4B are diagrams showing an occurrance of a wobbly vibration.
Figure 4B:
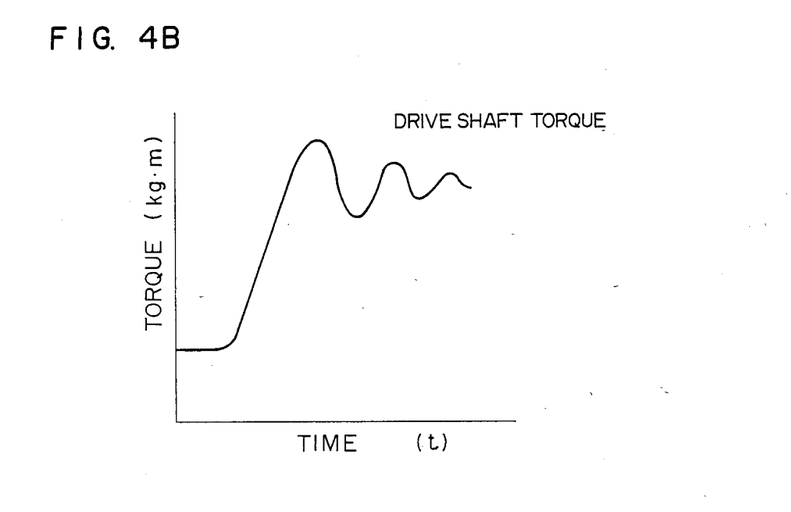

FIGS. 4A and 4B are diagrams showing an occurrence of the wobbly vibration. The engine torque generated as shown in FIG. 4A causes a resonance in a torsional vibration of the vibration system as shown in FIG. 4B.

Figure 5A:
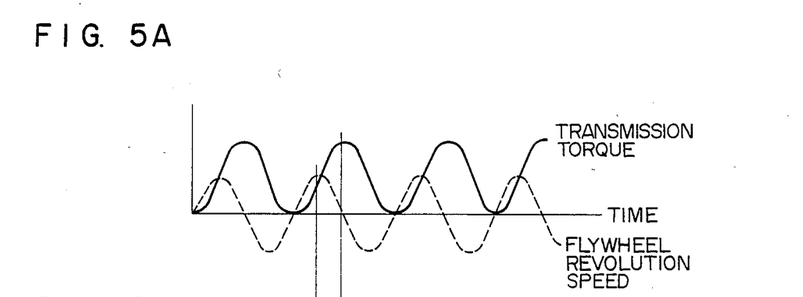
FIGS. 5A, 5B and 5C are diagrams showing a mechanism for suppressing the wobbly vibration.
Figure 5B:
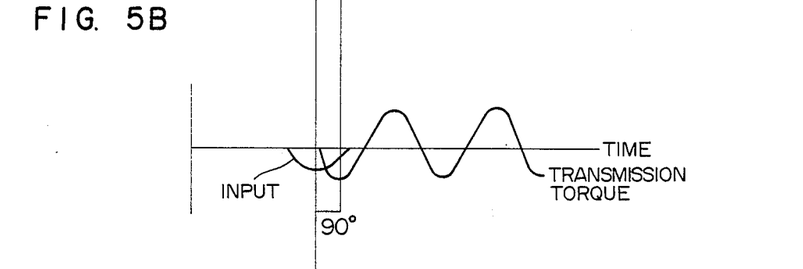
Figure 5C:
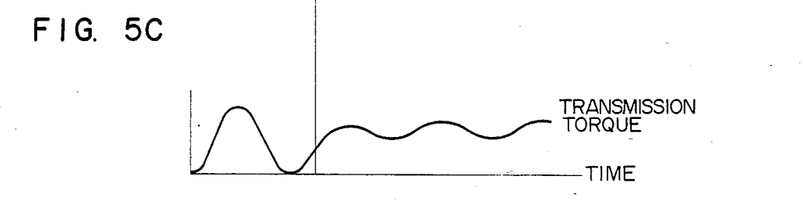

FIGS. 5A, 5B and 5C show a vibration damping mechanism for a wobbly vibration. In a dynamic model having one degree of freedom, when a stepwise input is torque supplied to the flywheel, an oscillating transmission torque is generated as indicated with a solid line in FIG. 5A. At that time, an oscillating flywheel revolution is generated with 90 degrees phase lag as indicated with a broken line in the same figure. Now, if one sine wave of the oscillation torque having an inverse phase relative to the flywheel revolution phase is applied to the vibration system as indicated with a solid line in FIG. 5B, there is produced an oscillating transmission torque as also indicated in FIG. 5B, which has 90 degrees phase lag relative to the applied torque. Thus, the phase of the transmission torque indicated with a solid line in FIG. 5A is inverse relative to that of the transmission torque shown in FIG. 5B. Accordingly, these two transmission torque are cancelled by each other, thereby decreasing the wobbly vibration as shown in FIG. 5C. From the above description, it will be easily understood that a wobbly fore- and-aft vibration of vehicle is damped by applying a wave-shaped torque having a inverted phase relative to the phase of flywheel oscillation caused by a stepwise engine torque. The application of the wave-shaped cycle torque is achieved by controlling the ignition timing in consideration of the phase of revolutional fluctuation of the flywheel.

Operations of MPU will be explained by referring to flow charts in FIG. 6–11.

Figure 6:
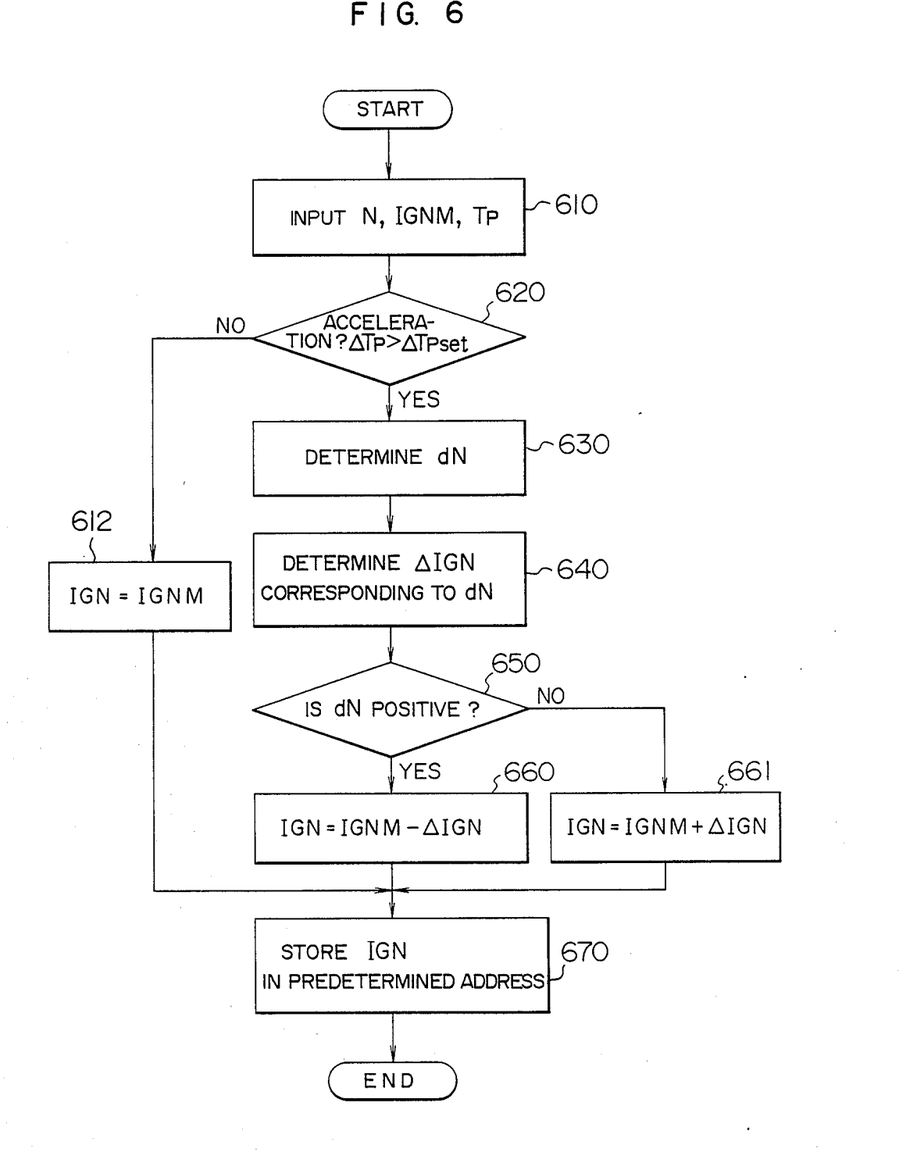
FIG. 6 is a flow chart for showing ignition timing adjustment of the prior art which is referred to in the specification as disclosed by the present applicant.
Figure 7:
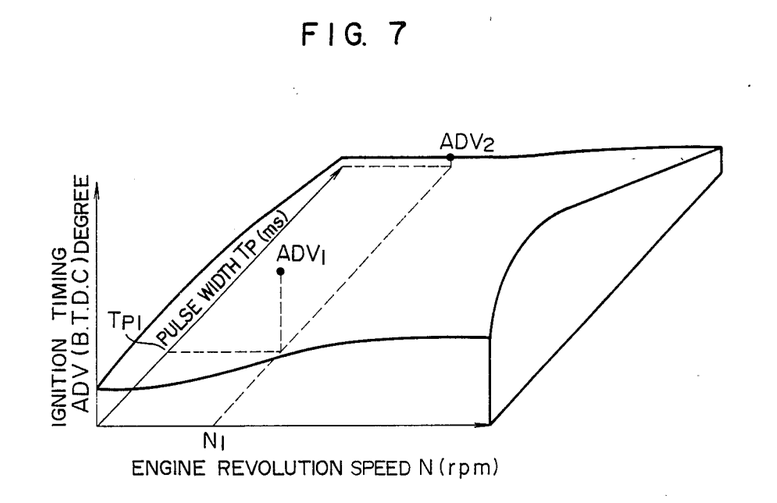
FIG. 7 is a diagram showing a characteristic of the basic ignition timing.
Figure 8:
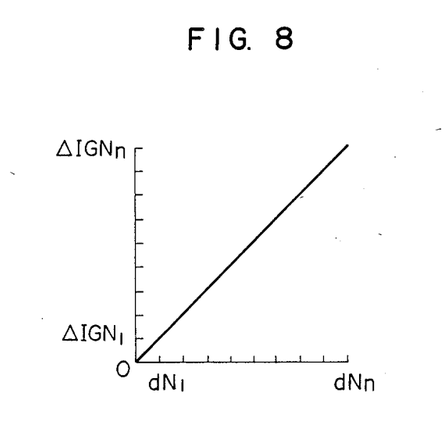
FIG. 8 is a diagram showing an ignition timing compensation magnitude in relation to the engine revolution change.

FIG. 6 shows a flow chart for an ignition timing adjusting apparatus of the aforementioned prior art disclosed in Japanese Patent Application No. 61-117312. In this flow chart, at step 610, the engine revolution speed N and the injection pulse width Tp are input, and the basic ignition timing IGNM is determined on the basis of the input values. The basic ignition timing IGNM is previously stored in ROM 211, for example, as its characteristic shown in FIG. 7 and is read out on the basis of the engine revolution speed N and the injection pulse width Tp in the actual conditions of the engine operation. In step 620, it is decided whether the engine revolution speed is under acceleration or not. When an increment ΔTp of the injection pulse width Tp is greater than a predetermined set value ΔTpset, the engine revolution speed is decided to be under acceleration. In step 630, the revolution speed change dN is calculated in accordance with a program stored in ROM on the basis of various sensor outputs input into MPU through I/O. In step 640, a compensation magnitude ΔIGN corresponding to the engine revolution speed change dN is determined by reading out the data stored in ROM 211 which define the relation between the ignition timing compensation magnitude ΔIGN and the engine revolution speed change dN as shown in FIG. 8. In step 650, it is decided whether the engine revolution speed change dN is positive or negative. In case of positive engine revolution change, in step 660, the ignition timing IGN is determined by the following equation (1) of substrating the compensation magnitude ΔIGN from the basic ignition timing IGNM.

$$IGN = IGNM - \Delta IGN \quad \ldots (1)$$

In case of negative engine revolution speed change, the ignition timing IGN is determined by the following equation (2) of adding the compensation magnitude ΔIGN to the basic ignition timing IGNM.

$$IGN = IGNM + \Delta IGN \quad \ldots (2)$$

When the acceleration is not decided in step 620, the basic ignition timing IGNM is used as the ignition timing ING in step 612 as it is. Finally, in step 670, the data determined as the ignition timing ING is stored into a predetermined address of RAM 213. The program proceeding as above-mentioned is ended in this step.

Figure 9:
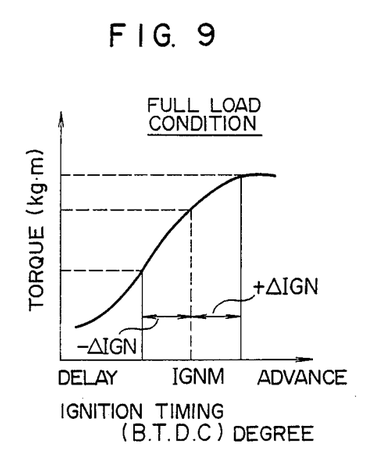
FIG. 9 is a diagram showing a relation between an engine torque and the ignition timing in an full load condition of the engine.
Figure 10:
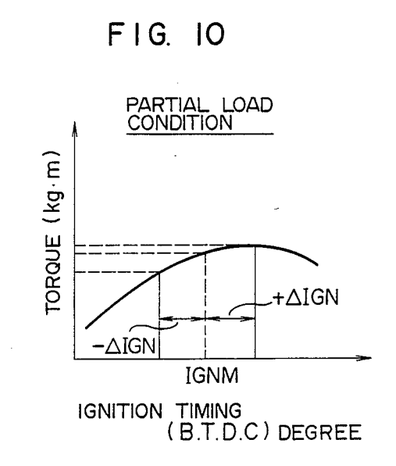
FIG. 10 is a diagram showing a relation between the engine torque and the ignition timing in the partial load condition of the engine.

FIGS. 9 and 10 show the engine torque change versus the ignition timing, in a throttle fully opened range (hereinafter referred to as WOT range) and in the partial load range of the engine, respectively. In comparing one case that the ignition timing is advanced or delayed in the compensation magnitude ΔIGN to the basic ignition timing IGNM in FIG. 9 with other case done similarly as the one case in FIG. 10, the resulted engine torque changes in those cases are considerably different from each other. That is, the engine torque changes in the WOT range and the partial load range are different from each other as well as the above two cases. Accordingly, there is or not the case that te sufficient suppress effect of the revolution speed change is obtained from the load conditions even if the revolution speed change is the same direction and the same magnitude as those cases. The present invention is conceived on the basis of the recognition of the above matters and will be explained as follows.

Figure 11:
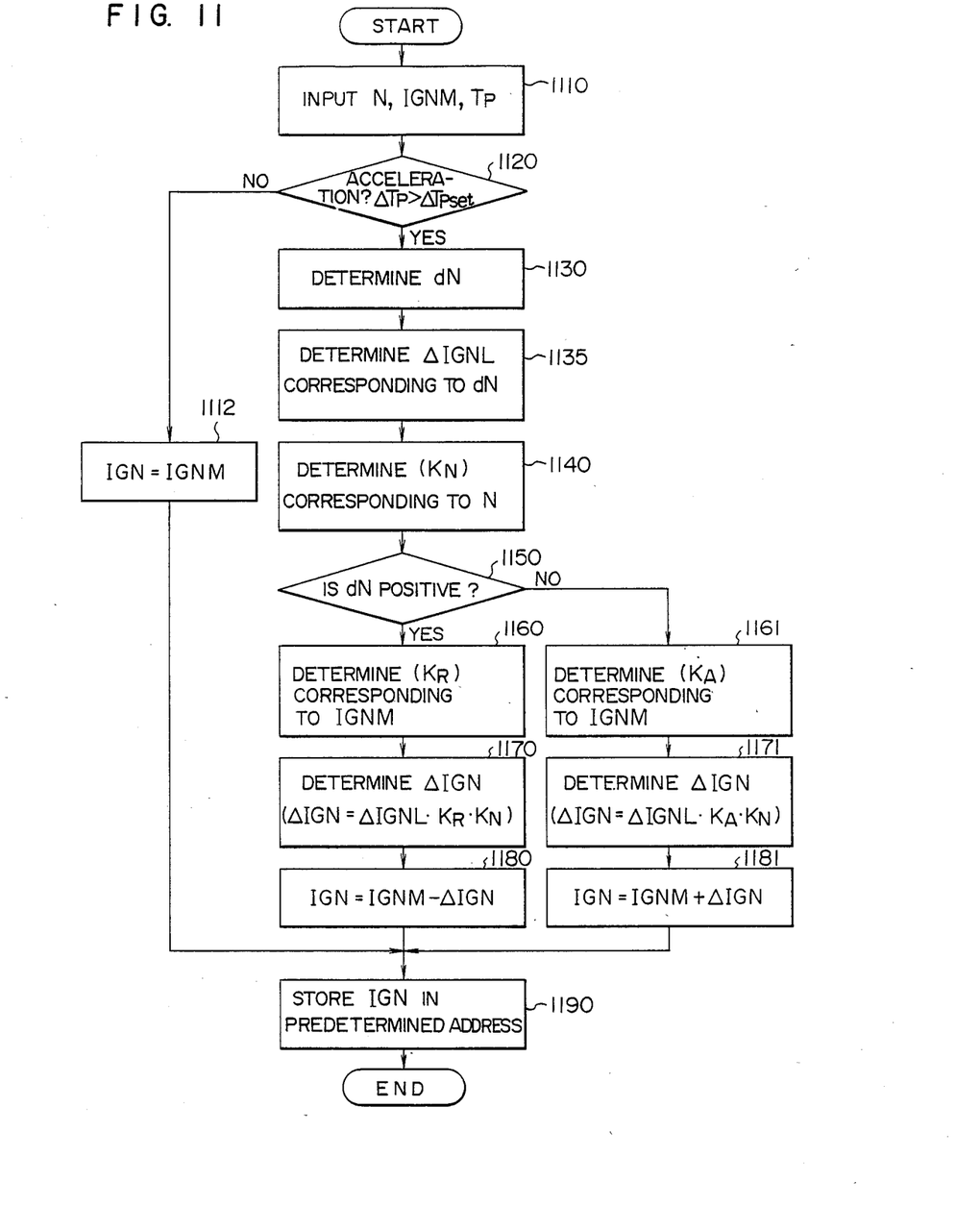
FIG. 11 is a flow chart showing ignition timing adjustment according to one embodiment of the present invention.
Figure 12:
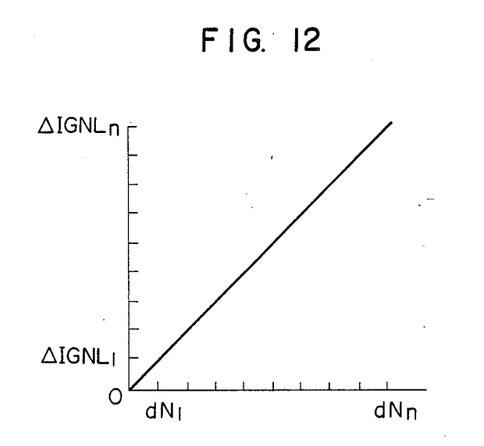
FIG. 12 is a diagram showing the ignition timing compensation magnitude in relation to the engine revolution speed change.
Figure 16:
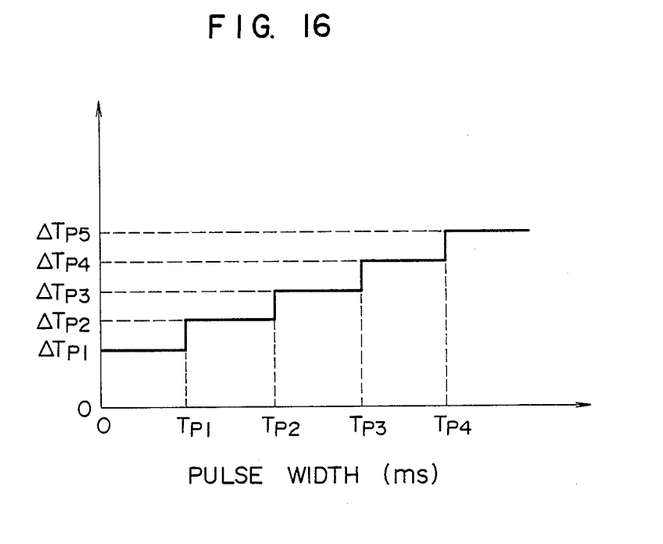
FIG. 16 is a diagram showing a detected acceleration levels in relation to fuel injection pulse widths.

FIG. 11 shows a flow chart relating to the ignition timing adjustment according to one embodiment of the present invention. In this flow chart, at step 1110, the engine revolution speed N and the injection pulse width Tp are input into MPU, and the basic ignition timing IGNM is determined by these input values. The characteristic of the engine revolution speed N and the injection pulse width Tp is previously stored in ROM 211 as shown in FIG. 7, and a basic ignition timing to be applied is determined by reading out the basic ignition timing according to the engine revolution speed and the injection pulse width from ROM 211. In step 1120, it is decided whether the engine condition is under acceleration or not. In comparing the injection pulse width change ΔTp with a standard change value ΔTpset, the engine condition to be under acceleration is decided in accordance with the program previously stored in ROM 211. The standard change value ΔTpset is, for example, read out from ROM 211 in which a characteristic of ΔTpset is stored correspondingly to various values Tp as shown in FIG. 16. When, in step 1120, no acceleration has been detected, the basic ignition timing IGNM with no compensation applied is used in step 1112 as the ignition timing IGN. In place of the pulse width Tp, a throttle opening degree or an amount of air may be used for deciding the engine acceleration. In step 1130, the revolution speed change dN is calculated in MPU 212 in accordance with a program proviously stored in ROM 211 by referring to the detected engine revolution speed N. In step 1135, a compensation magnitude ΔIGNL corresponding to the engine revolution speed change dN is decided in MPU 212 by reading out the data stored in ROM 211 which define the characteristic of the ignition timing compensation magnitude ΔIGNL in relation to the engine revolution speed change dN as shown in FIG. 12.

In steps 1140, 1160, 1170, 1180, 1161, 1171 and 1181, various compensation coefficients are obtained. In the present invention, a wobbly vibration is prevented by suitably advancing or delaying the basic ignition timing input in step 1110.

Figure 13:
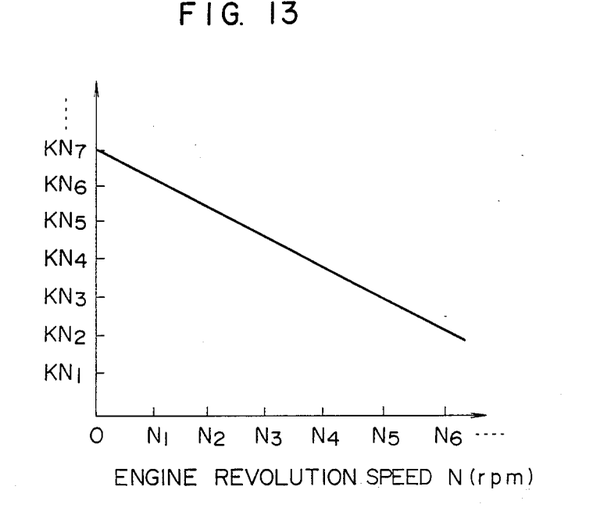
FIG. 13 is a diagram showing the ignition timing compensation magnitude in relation to the engine revolution speed.

Therefore, in step 1140, the compensation coefficient $K_N$ corresponding to the engine revolution speed N is decided in MPU 212 by referring to the revolution speed N input from I/O 214, and then, for example, the characteristic of the compensation coefficient $K_N$ is stored in ROM 211 as shown in FIG. 13. In the relatively high range of the engine revolution speed, the amplitude of the wobbly vibration dose not become so great by reason that a rotary inertia already reaches to a increased condition, while in the relatively low range of the engine revolution speed, a wobbly vibration is rather severe because of smaller rotary inertia, thereby causing an uncomfortable riding of vehicle. In consideration of the condition of the wobbly vibration in relation to the engine revolution speed, the compensation coefficient $K_N$ has been determined, thereby compensating the ignition timing.

In step 1150, it is decided whether the engine revolution speed is increasing or decreasing by referring to the sign, i.e. plus or minus, of the engine revolution speed change dN. In steps following to step 1150, in case of increasing the engine revolution speed, the ignition timing is compensated so as to decrease the engine revolution speed, while in case of decreasing the engine revolution speed, the ignition timing is compensated so as to increase the engine revolution speed. That is, in case of increasing the engine revolution speed, the engine torque is decreased by delaying the ignition timing, while in case of decreasing the ignition revolution speed, the engine torque is increased by advancing the ignition timing. This process is effective for preventing a wobbly vibration.

As seen in FIG. 9 and 10, in the WOT range as well as in the engine partial load range, the engine torque increment produced by an ignition phase advance $\Delta$IGN from the basic ignition timing IGNM is not equal to the engine torque decrement produced by an ignition timing delay $\Delta$IGN of the same magnitude.

Figure 14:
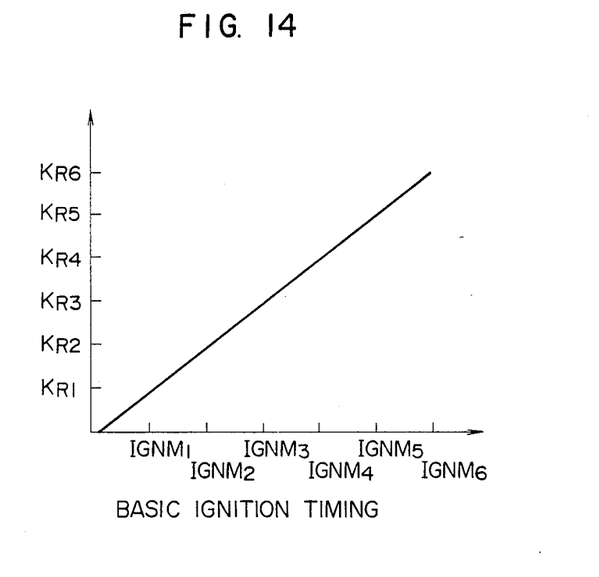
FIG. 14 is a diagram showing a compensation coefficient for compensating the ignition timing in a delay side in relation to the basic ignition timing.
Figure 15:
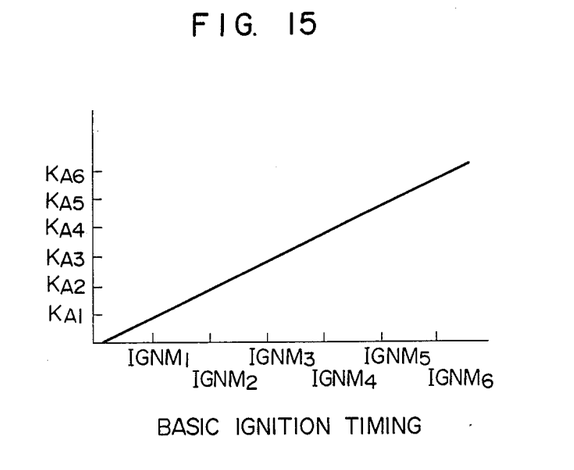
FIG. 15 is a diagram showing a compensation coefficient for compensating the ignition timing in a advance side in relation to the basic ignition timing.

In step 1160 according to the present invention, the compensation coefficient in the ignition timing delay is determined, while in step 1161, the compensation coefficient in the ignition timing advance is determined. FIG. 14 shows a compensation coefficient $K_R$ in the delay direction of the ignition timing, while FIG. 15 shows the compensation coefficient $K_A$ in the advance direction of the ignition timing. These compensation coefficients $K_R$ and $K_A$ are determined correspondingly to various values of the basic ignition timing IGNM, which represents an engine load condition. Further, even in the same engine load condition, $K_R$ is greater than $K_A$, effecting a greater compensation of the basic ignition timing IGNM.

In step 1160, the compensation coefficient $K_R$ corresponding to the basic ignition timing IGNM is determined. In step 1170, the compensation magnitude $\Delta$IGN is determined from the following equation (3) of the multiplication of the $\Delta$IGNL based on the engine revolution speed change, the compensation coefficient $K_R$ corresponding to the basic ignition timing IGNM and the compensation coefficient $K_N$ corresponding to the engine revolution speed N.

$$\Delta IGN = \Delta IGNL \cdot K_R \cdot K_N \quad \ldots (3)$$

In step 1180, the ignition timing IGN is determined from the following equation (4) of substructing the compensation magnitude $\Delta$IGN from the basic ignition timing IGNM.

$$IGN = IGNM - \Delta IGN \quad \ldots (4)$$

On the other hand, when the sign of the engine revolution change dN is decided as minus in step 1150, the compensation coefficient $K_A$ corresponding to the basic ignition timing IGNM is determined in step 1161.

Then, in step 1171, the compensation magnitude $\Delta$IGN is determined from the following equation (5) of the multiplication of the $\Delta$IGNL based on the engine revolution change, the compensation coefficients $K_A$ corresponding to the basic ignition timing IGN and the compensation coefficient $K_N$ corresponding to the engine revolution N.

$$\Delta IGN = \Delta IGNL \cdot K_A \cdot K_N \quad \ldots (5)$$

Further, in step 1181, the ignition timing IGN is determined from the following equation (6) of adding the compensation magnitude $\Delta$IGN to the basic ignition timing IGNM.

$$IGN = IGNM + \Delta IGN \quad \ldots (6)$$

Finally, in step 1190, the determined ignition timing IGN is stored into a predetermined address of RAM 213.

Although, in the above embodiment, the compensation magnitude $\Delta$IGN of the ignition timing is determined from the multiplication of the compensation magnitude $\Delta$IGNL based on the engine revolution speed change, the compensation coefficients $K_R$, $K_A$ based on the basic ignition timing and the compensation coefficient $K_N$ based on the engine revolution speed, the compensation magnitude $\Delta$IGN may be determined from the following equation (6) of adding the compensation magnitude $\Delta$IGNL based on the engine revolution speed change, the compensation magnitude $\Delta$IGNK corresponding to the compensation magnitude $K_R$, $K_A$ in relation to the basic ignition timing and the compensation magnitude $\Delta$IGN$_N$ corresponding to the compensation magnitude $K_N$ based on the engine revolution speed, respectively.

$$\Delta IGN = \Delta IGNL + \Delta IGN_K + \Delta IGN_N \quad \ldots (7)$$

Figure 17:
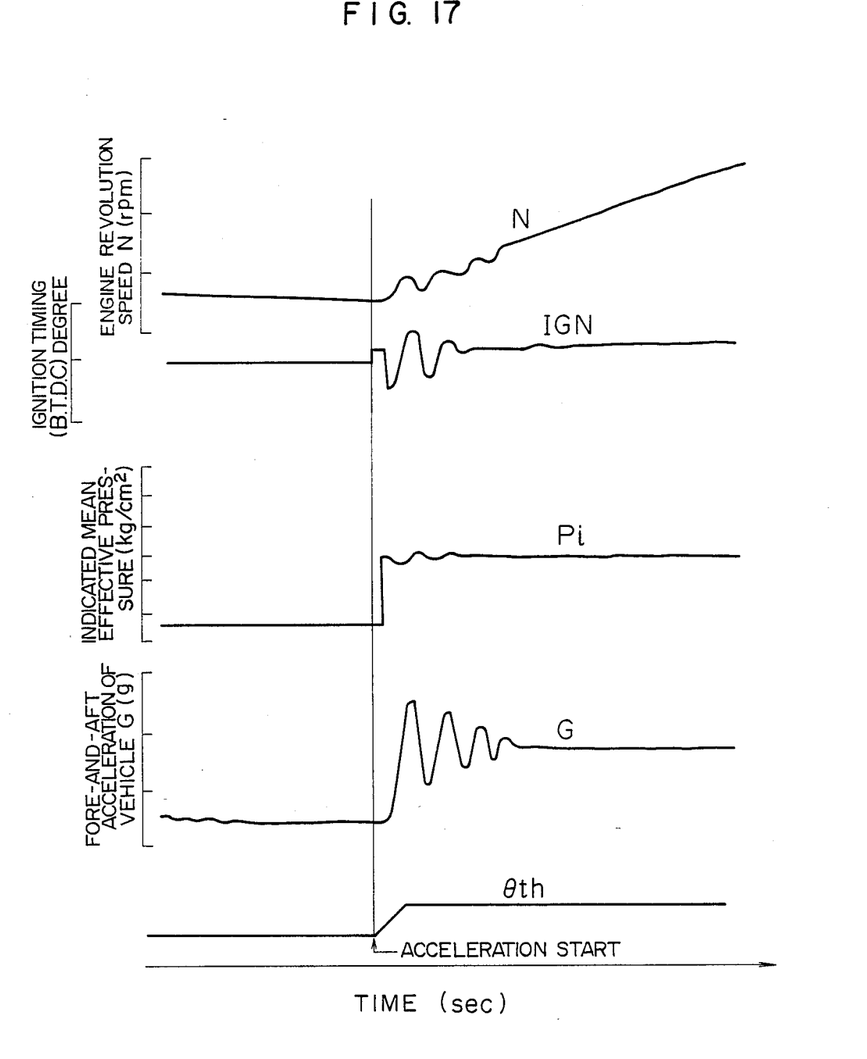
FIG. 17 is a diagram showing an indicated mean effective pressure, the ignition timing and the engine revolution versus time series of fore-and-aft acceleration of vehicle in the prior art referred to in the specification as filed by the present applicant.
Figure 18:
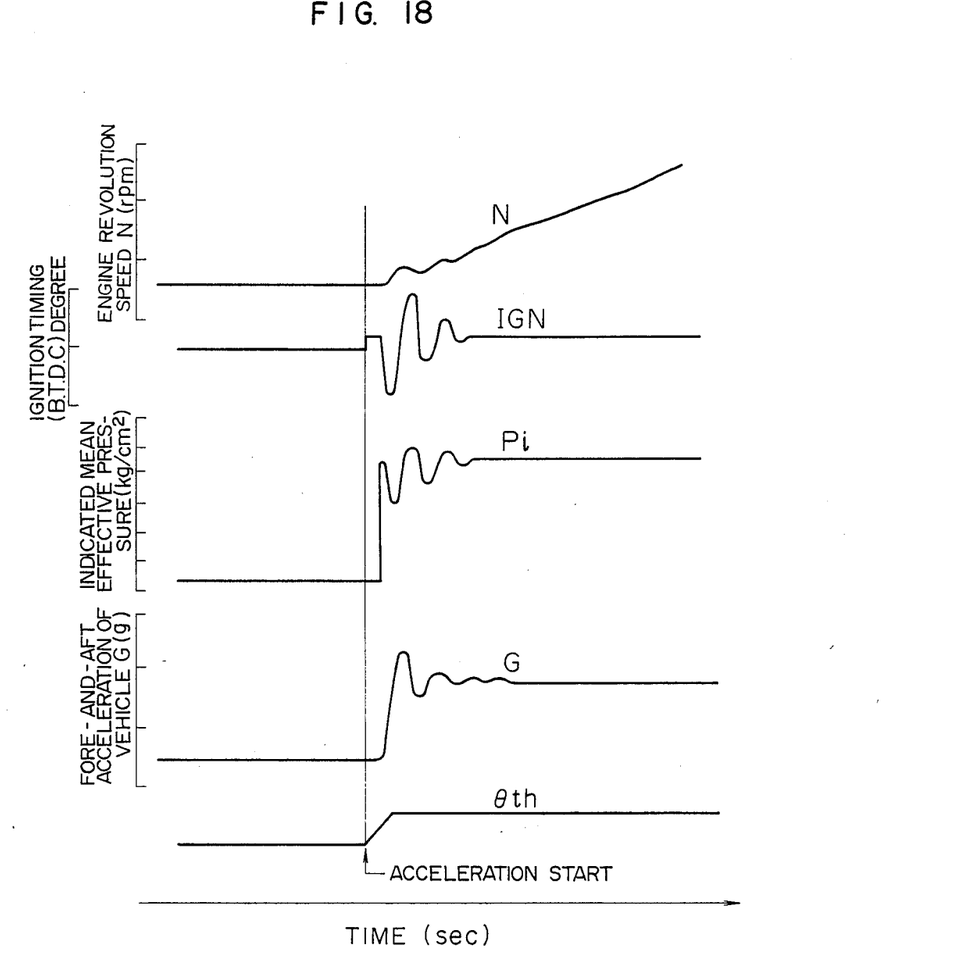
FIG. 18 is a diagram showing items similar to those in FIG. 17 according to an embodiment of the present invention.

As to FIGS. 17 and 18, the fluctuation of a fore-and-aft acceleration G of vehicle and the engine revolution speed N based on one embodiment of the prior art and the present invention shall be described as follows. FIGS. 17 and 18 show the change of the fore-and-apt acceleration G of vehicle, the indicated mean effective pressure $P_1$, the ignition timing IGN and the engine revolution speed N defined on an axis of ordinate versus a time defined on an axis of abscissa, respectively. FIG. 17 shows a control mode according to the flow chart of FIG. 6, and FIG. 18 shows an embodiment according to the flow chart of FIG. 11.

As shown in FIG. 17, in the embodiment of FIG. 6, the fore-and-aft acceleration is considerably changed up and down, whereby an stable operation of the engine is not obtained from such case. On the other hand, in the embodiment of the present invention as shown in FIG. 18, the comfortable operation of the engine is realized since the fore-and-apt acceleration of vehicle is stabilized during a short period of time after the engine is accelerated.

As described above in detail, in the present invention, a wobbly vibration caused when accelerated in the wide operation range of the engine is quickly damped by adjusting the ignition timing together with the compensation of the basic ignition timing in consideration of the engine revolution speed change and the engine load condition, that is, considerably improving the damping of the vibration. Although it is necessary to lower a peak G of the vibration in view of a feeling characteristic of human being, it has been made clear by the other experience associated with the above conditions that a greater damping of the vibration is advantageous to the suppression of the wobbly vibration.

What is claimed is:

1. An ignition timing adjusting apparatus of an internal combustion engine, comprising:
    means for determining a basic ignition timing on the basis of values indicating an operational state of an internal combustion engine;
    means for detecting acceleration of said engine;
    means for detecting revolution speed change of said internal combustion engine;
    first ignition timing compensating means for determining a first ignition timing compensation magnitude for compensating said basic ignition timing on the basis of the output of said engine revolution speed change detecting means;
    second ignition timing compensating means for determining a second ignition timing compensation magnitude for compensating said basic ignition timing on the basis of the load condition of said internal combustion engine; and means for determining the ignition timing on the basis of said basic ignition timing, said first ignition timing compensation magnitude and said second ignition timing compensation magnitude when the acceleration of the engine is detected by said acceleration detecting means.

2. An apparatus claimed in claim 1, further comprising third ignition timing compensating means for determining a third ignition timing compensation magnitude on the basis of said engine revolution speed; and said ignition timing determining means determining the ignition timing on the basis of said third ignition timing compensation magnitude in addition to said basic ignition timing, said first and second ignition timing compensation magnitudes.

3. An apparatus claimed in claim 1, wherein said second ignition timing compensation magnitude is set up so that it is smaller in case of decreasing the engine revolution than in case of increasing the engine revolution.

4. An apparatus claimed in claim 1, wherein the load condition for determining said second ignition timing compensation magnitude is represented by the basic ignition timing determined by means of said basic ignition timing determining means.

* * * * *